UNITED STATES PATENT OFFICE.

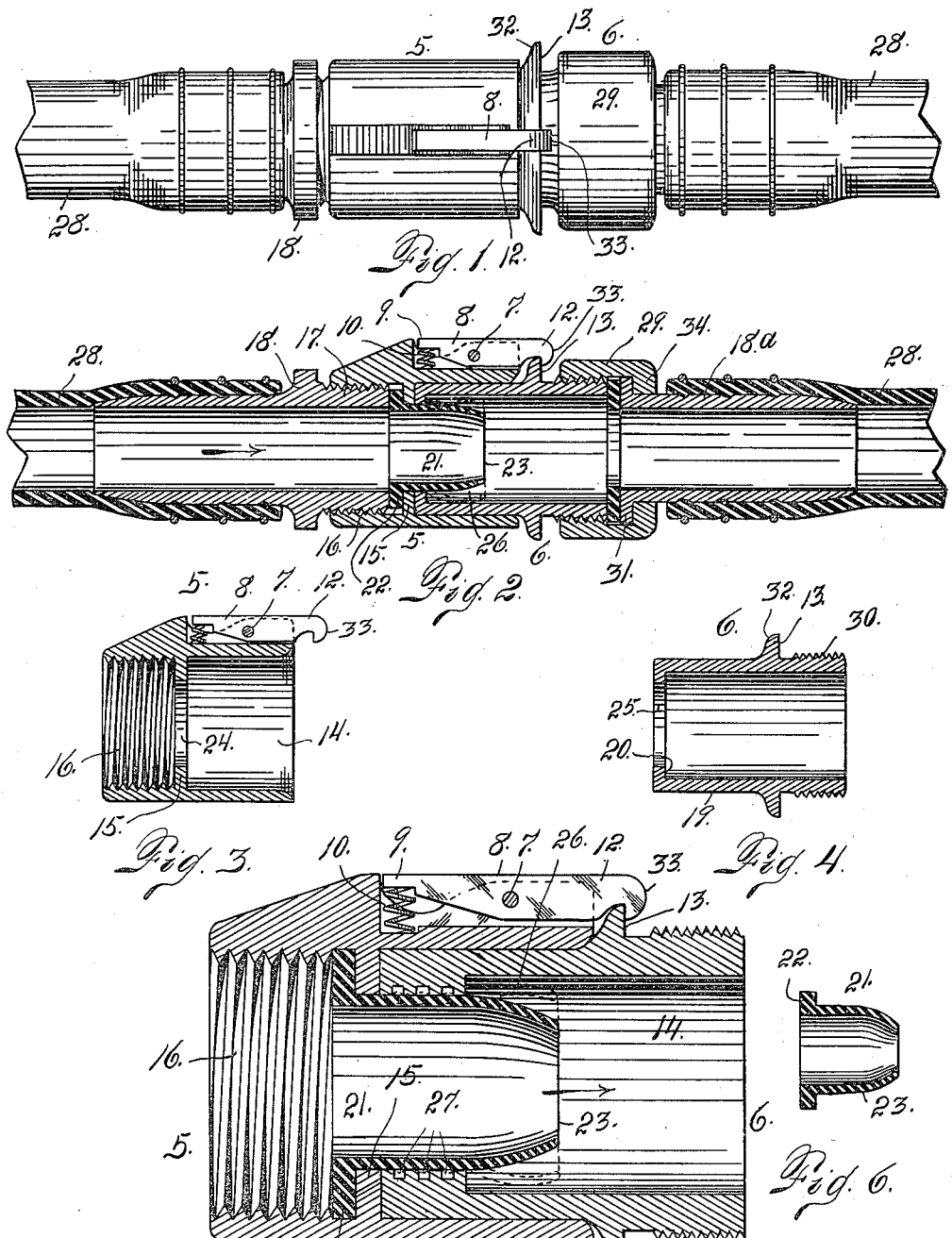

THEODORE N. JONES, OF BOULDER, COLORADO.

HOSE-COUPLING.

999,169.  Specification of Letters Patent.  Patented July 25, 1911.

Application filed November 10, 1910. Serial No. 591,684.

*To all whom it may concern:*

Be it known that I, THEODORE N. JONES, a citizen of the United States, residing at Boulder, county of Boulder, and State of Colorado, have invented certain new and useful Improvements in Hose-Couplings; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in hose couplings, my object being to provide a device of this character adapted for use on garden, fire or other hose, which shall be simple in construction and whereby the hose sections when equipped therewith shall be adapted to be easily connected and disconnected, the coupling at the same time forming a fluid-tight joint.

An important feature of my improved construction consists in a gasket interposed between the female member of the coupling and the screw sleeve connected with the hose section, the said gasket being composed of rubber or other suitable or similar material, and having a flexible part protruding into the male member of the coupling and passing the engaging shoulders of the two coupling members, the said flexible part extending beyond the said joint and into the opening of the male member, this extension constituting a floating portion of the gasket capable of expansion due to the passage of water therethrough, the expansion of the free or floating part of the gasket insuring a fluid-tight seal at the only point where the water could possibly escape from the coupling.

Having briefly outlined my improved construction, I will proceed to describe the same in detail, reference being made to the accompanying drawing in which is illustrated an embodiment thereof.

In this drawing: Figure 1 is an elevation illustrating two sections of hose connected by my improved coupling. Fig. 2 is a central longitudinal section of the same. Fig. 3 is a sectional view of the female member of the coupling. Fig. 4 is a similar view of the male member of the coupling. Fig. 5 is a sectional view in detail of the coupling proper showing a slightly modified form of construction, the two members being in the assembled relation. Fig. 6 is a sectional view in detail of the gasket.

The same reference characters indicate the same parts in all the views.

Let the numeral 5 designate the female member and 6 the male member of the coupling. Upon the female member is pivotally mounted as shown at 7, a locking dog 8 whose extremity 9 is acted on by a coil spring 10, which has a tendency to throw the hook end 12 of the dog inwardly. This hook end protrudes beyond the coupling member and is adapted to interlock with a circumferential shoulder 13 formed on the male member.

The female member of the coupling is provided with a socket 14 at the inner extremity of which is located a shoulder 15 formed by an interiorly projecting, relatively thin circumferential part. Beyond this shoulder is a threaded socket 16 adapted to receive the protruding threaded extremity 17 of a coupling sleeve 18 connected with the hose in the usual or any suitable manner.

The male member of the coupling is provided with a plain portion 19 having an interior shoulder 20 at its inner extremity, the inner extremity of this member being seated against the shoulder 15 of the female member when the parts are assembled (see Figs. 2 and 5).

The joint formed by the inner extremity of the male member and the shoulder 15 of the female member is protected or made fluid-tight by means of a gasket 21 having a base flange 22 engaging the shoulder 15 of the female member on the opposite side from the inner extremity of the male member. From the inner edge of the base flange of this gasket a flexible part 23 protrudes, the same being fitted into the openings 24 and 25 of the female and male members, passing beyond the joint formed by the two last named members and protruding some distance beyond the same into the male member opening. Where the gasket protrudes beyond the joint formed by the parts 15 and 20 of the male and female members, it constitutes a sort of floating or free part, since normally there is a space 26 between this floating part and the inner surface of the male member, thus giving the floating part an opportunity to expand due to the pressure of the water passing through the coupling in the direction of the arrow (see Figs. 2 and 5). This expansion of the floating part of the gasket effectually seals the joint formed by the parts 15 and 20 of the female and male members. It will be understood that the floating part of the gasket protrudes from the base flange of the latter in the direction of the water flow through the coupling. This is necessary in order that the gasket may properly perform its function.

In the form of construction illustrated in Fig. 5, the inwardly protruding flange or part 20 of the male member is made relatively thick and is provided on its inner surface with a number of circumferential grooves 27, which are engaged by the flexible protruding portion of the gasket 21 when the parts are assembled. The object of these grooves is to give further security to the seal obtained through the instrumentality of the gasket, since the pressure of the water when passing through the coupling will have a tendency to cause the gasket to swell outwardly into the said grooves, thus further insuring the sealing of the joint against the possibility of the passage of water between the gasket and the parts of the two members forming the said joint. Attention is called to the fact that when the coupling members are connected with the sleeves 18 and 18<sup>A</sup> of the hose coupling sections 28, the threaded part 17 of the sleeve 18 engages the base flange of the gasket; while the sleeve 18<sup>A</sup> is connected with the male member of the coupling by a screw sleeve 29 engaging an exteriorly threaded part 30 of the adjacent male coupling member, the coupling sleeve having an interiorly protruding part 34 forming a shoulder which engages a shoulder 31 formed on the sleeve 18<sup>A</sup>. If we assume that the coupling members are assembled or connected in the coupling relation, in order to disconnect them it is only necessary to press inwardly on the spring-actuated extremity 9 of the locking dog 8. This will disconnect the hooked end 12 of the dog from the shoulder 13 of the male member. The two parts may then be disassociated by an endwise movement or a movement parallel with the axis of the coupling. In order to connect the two members in the coupled relation it is only necessary to press the part 19 of the member 6 into the socket 14 of the member 5 until the hooked extremity 12 of the dog engages the locking face of the shoulder 13 of the male member. The opposite face of this shoulder is curved or beveled as shown at 32, whereby the rounded surface 33 of the hooked extremity of the dog is automatically forced outwardly as the two parts come together, until the straight or locking face of the shoulder 13 is in position to allow the hooked end of the dog to spring into engagement therewith.

Having thus described my invention, what I claim is:

1. A hose coupling composed of male and female members, one member being interiorly reduced in size at its abutting extremity, and the other member being provided with a gasket having a portion protruding into the one member beyond the reduced portion, the portion of the gasket protruding beyond the reduced portion being normally free from contact with the wall of the last named member and adapted to expand toward the said wall over the reduced portion, to form a fluid tight joint, substantially as described.

2. A hose coupling composed of interlocking male and female members, one member being provided with a gasket having a portion protruding into the other member, the latter having an interiorly projecting shoulder through which the said gasket passes, and protrudes beyond the same into a floating portion, whereby the gasket is normally separated from the wall of the male member beyond the shoulder, allowing it to expand outwardly toward the said wall over the shoulder, under the pressure of the passing water, and forming a fluid tight joint with the said shoulder which coöperates therewith, for the purpose, substantially as described.

3. A hose coupling composed of male and female members, the female member having an inwardly protruding circumferential part forming a stop engaged by the inner extremity of the male member, the latter being also provided with an inwardly protruding shoulder, and a gasket having a base flange engaging the shoulder of the female member on the opposite side from that which is engaged by the male member, the said gasket having a part protruding in the direction of the flow of the water passing the joint and the shoulders formed on the two members, and having a floating part extending beyond the said shoulders, the gasket being flexible and the floating part being adapted to be automatically expanded over the shoulder of the male member by the pressure of the water passing therethrough, substantially as described.

4. A hose coupling composed of interlocking male and female members, the two members having interiorly protruding engaging shoulders, one of the members having a gasket provided with a base flange engaging one of said shoulders on the opposite side from that engaged by the shoulder of the other member, the gasket having a flexible part protruding in the direction of the flow of water past the joint formed by the two shoulders, and having a floating part extending beyond the said shoulders, the floating part of the gasket tapering inwardly and adapted to expand due to the pressure of the water passing therethrough, the interiorly protruding shoulder of the male member having circumferential grooves surrounding the protruding part of the gasket substantially as described.

In testimony whereof I affix my signature in presence of two witnesses.

THEODORE N. JONES.

Witnesses:
 HORTENSE UHLRICH,
 F. E. BOWEN.